(12) United States Patent
Doppler et al.

(10) Patent No.: US 8,958,401 B2
(45) Date of Patent: Feb. 17, 2015

(54) METHOD AND APPARATUS FOR ASSISTED NETWORK DISCOVERY

(75) Inventors: Klaus Doppler, Espoo (FI); Juha Korhonen, Espoo (FI)

(73) Assignee: Nokia Corporation, Espoo (FI)

( * ) Notice: Subject to any disclaimer, the term of this patent is extended or adjusted under 35 U.S.C. 154(b) by 607 days.

(21) Appl. No.: 12/772,817

(22) Filed: May 3, 2010

(65) Prior Publication Data

US 2011/0267977 A1 Nov. 3, 2011

(51) Int. Cl.
| H04W 4/00 | (2009.01) |
| H04B 1/18 | (2006.01) |
| H04W 48/16 | (2009.01) |
| H04W 48/08 | (2009.01) |

(52) U.S. Cl.
CPC .............. *H04W 48/16* (2013.01); *H04W 48/08* (2013.01)
USPC ........................................ 370/338; 455/161.1

(58) Field of Classification Search
None
See application file for complete search history.

(56) References Cited

U.S. PATENT DOCUMENTS

| 7,239,620 | B2 * | 7/2007 | Storm ........................... 370/331 |
| 8,433,312 | B2 * | 4/2013 | Salomone et al. .......... 455/422.1 |
| 2002/0082010 | A1 * | 6/2002 | Koorapaty et al. ........... 455/434 |
| 2004/0116090 | A1 * | 6/2004 | Gounalis ..................... 455/161.1 |
| 2005/0266845 | A1 * | 12/2005 | Aerrabotu et al. ............ 455/436 |
| 2006/0023686 | A1 * | 2/2006 | Jeong et al. .................... 370/338 |
| 2006/0098610 | A1 * | 5/2006 | Sundberg et al. .............. 370/338 |
| 2006/0193299 | A1 * | 8/2006 | Winget et al. ................. 370/338 |
| 2006/0217147 | A1 * | 9/2006 | Olvera-Hernandez et al. .......................... 455/552.1 |
| 2007/0032236 | A1 * | 2/2007 | Kim et al. ..................... 455/436 |
| 2007/0297358 | A1 * | 12/2007 | Chang et al. .................. 370/328 |
| 2008/0019333 | A1 * | 1/2008 | Kharia et al. ................. 370/338 |
| 2008/0058003 | A1 * | 3/2008 | Rydnell et al. ............. 455/552.1 |
| 2008/0096501 | A1 * | 4/2008 | Salomone et al. ......... 455/161.1 |
| 2008/0127328 | A1 * | 5/2008 | Estevez et al. .................. 726/17 |
| 2009/0068969 | A1 * | 3/2009 | Lindoff et al. ............. 455/161.1 |
| 2009/0068970 | A1 | 3/2009 | Ahmed et al. |
| 2009/0245206 | A1 * | 10/2009 | Liu ............................... 370/331 |
| 2010/0040029 | A1 | 2/2010 | Doppler et al. |
| 2010/0080134 | A1 * | 4/2010 | Maniatopoulos et al. ..... 370/252 |
| 2012/0026994 | A1 * | 2/2012 | Agarwal et al. ............... 370/338 |

FOREIGN PATENT DOCUMENTS

| WO | 2009120902 A1 | 10/2009 |
| WO | 2009134183 A2 | 11/2009 |

OTHER PUBLICATIONS

International Search Report and Written Opinion received in corresponding Patent Cooperation Treaty Application No. PCT/FI2011/050282, Jul. 4, 2011, 12 pages.

3GPP TS 23.402 v9.4.0, "Technical Specification Group Services and System Aspects", Release 9 (Mar. 2010), Change Request (May 2009) and Change Request (Sep. 2009), 204 pages.

* cited by examiner

*Primary Examiner* — Hassan Phillips
*Assistant Examiner* — Hicham Foud
(74) *Attorney, Agent, or Firm* — Mintz Levin Cohn Ferris Glovsky and Popeo, P.C.

(57) ABSTRACT

In accordance with an example embodiment of the present invention, there is provided a user equipment configured to receive local network connectivity information over a first wireless interface, determine a scanning strategy based at least in part on the received information, and discover a local network over a second wireless interface using at least in part the determined scanning strategy.

24 Claims, 5 Drawing Sheets

METHOD AND APPARATUS FOR ASSISTED NETWORK DISCOVERY

TECHNICAL FIELD

The present application relates generally to assisted network discovery in a context of local area networks.

BACKGROUND

Cells comprised in cellular communication networks may have various sizes depending on how the network is designed. Cellular cells may have radii of several kilometers, for example. Local networks such as wireless local area networks, WLANs, Femto cells or local area evolution, LAE, networks may be configured to have smaller cells than cellular communication networks. Local network cells may have radii of tens to hundreds of meters, for example. Local area network cells, like cellular cells, may be non-circular in shape; they may for example be shaped like sectors of antennas. Local networks may comprise only one cell such as a WLAN access point, AP, or they may comprise several local network cells.

Cellular and local networks may have different characteristics of service offered to mobile units attached thereto. For example, a cellular system may provide wide-area coverage by means of larger cells and lossless handover and roaming procedures. Local networks may offer more localized service with higher datarates than obtainable in co-located cellular cells. Local networks and their cells may be configured to serve less mobile users than cellular networks.

Cellular and local networks may complement each other. A local network cell may be configured to receive users from a cellular cell the local network cell is located at least partly in. For example, a cellular cell may be configured to hand over an attached mobile to a local cell when the mobile request a high datarate that the local cell can offer more readily than the cellular cell.

In order to change attachment from a cellular cell to a local cell, a mobile may need to discover the local cell by detecting a beacon transmission from the local cell. In order to change attachment from a local cell to a cellular cell, a mobile may need to discover the cellular cell by detecting a beacon transmission from the cellular cell.

SUMMARY

Various aspects of examples of the invention are set out in the claims.

According to a first aspect of the invention there is provided an apparatus, comprising transceiver circuitry configured to receive local network connectivity information from a first interface, logic circuitry configured to determine a scanning strategy based at least in part on the received information, memory configured to store the received information and parameters relating to the determined scanning strategy, the logic circuitry further configured to cause the discovering of a local network cell over a wireless second interface using at least in part the determined scanning strategy.

According to a second aspect of the invention there is provided a method, comprising receiving in a user equipment local network connectivity information over a first interface, determining a scanning strategy based at least in part on the received information, and discovering a local network over a wireless second interface using at least in part the determined scanning strategy.

According to a second aspect of the invention there is provided a computer program product comprising a computer-readable storage medium bearing computer program code embodied therein for use with a computer, the computer program code comprising code for receiving local network connectivity information over a first interface, code for determining a scanning strategy based at least in part on the received information; and code for discovering a local network over a wireless second interface using at least in part the determined scanning strategy.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
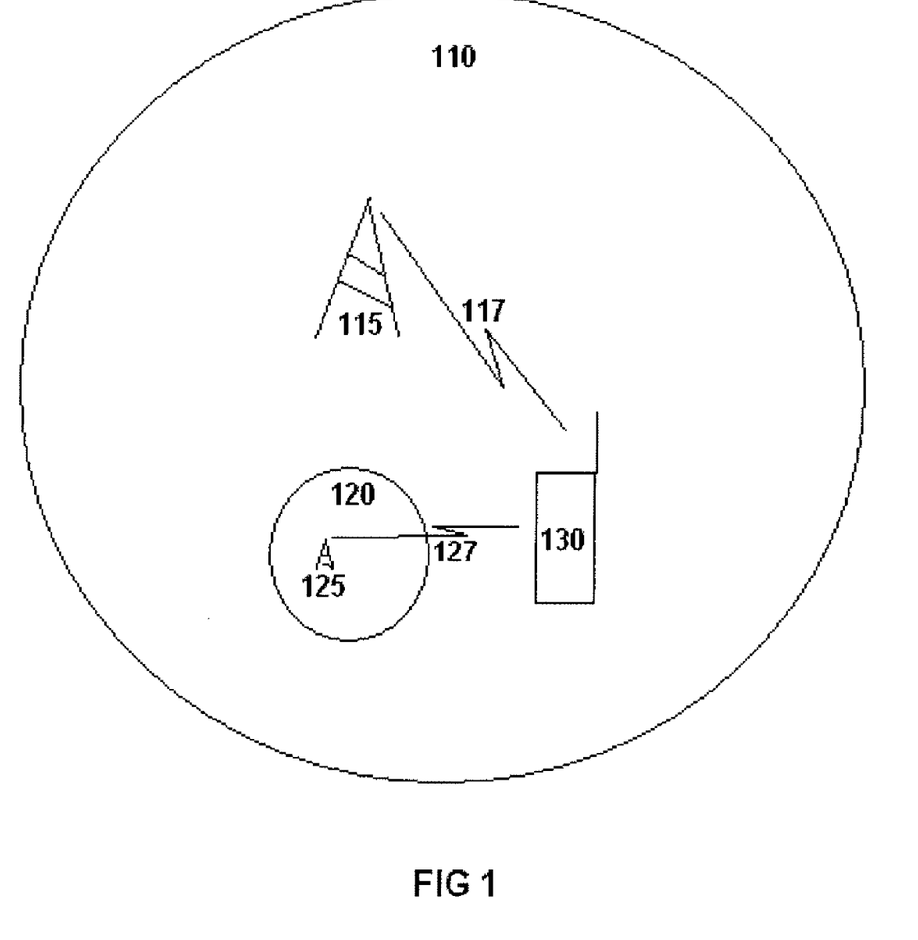
FIG. 1 illustrates network elements capable of supporting some embodiments of the invention.

FIG. 1 illustrates network elements capable of supporting some embodiments of the invention. In this example, a mobile terminal such as for example a user equipment, UE, is denoted with reference 130 and it is located within a cellular cell 110. Communications in cellular cell 110 are governed by base station, BS, 115, and UE 130 and base station 115 are configured to communicate over wireless interface 117. Wireless interface 117 may comprise an uplink conveying information from UE 130 to BS 115, and a downlink conveying information from BS 115 to UE 130. The conveyed information may comprise, for example, coded speech samples for a voice call, coded video information for a video call or segments of digital files being transmitted to/from the UE 130. The uplink may be separated from the downlink in frequency domain, meaning that the uplink operates in a different frequency band than the downlink. In another example the uplink and the downlink may share a frequency band by segmenting transmissions in the time domain, meaning that when the uplink is active the downlink does not transmit, and when the downlink is active the uplink does not transmit.

UE 130 may be configured to roam in the cellular network cellular cell 110 is comprised in. Such roaming may comprise reacting to a determination that UE 130 is near a cell edge of cellular cell 130, for example, and responsively causing handover procedures to be conducted which result in the attachment of UE 130 being transferred from cellular cell 110 to another, adjacent cellular cell, which is not illustrated in FIG. 1. The determination may relate to a signal power level from BS 115 being considered to be low while simultaneously detecting a beacon signal from the adjacent cell.

FIG. 1 also illustrates a local cell 120 and its associated BS 125, which may be, for example, a WLAN AP or a base station of a LAE system or a Femto cell. In the illustrated example, the coverage area of local cell 120 is comprised within the coverage area of cellular cell 110. It is also possible that the coverage areas of the two cells overlap only partially, or that the cells are substantially adjacent, or that their coverage areas are separated from each other geographically. While in cell 110, UE 130 may be configured to scan for local cells such as cell 120. When scanning for local cells, UE 130 may listen on a radio interface disposed in a local cell for a beacon signal from a BS of a local cell. A radio interface between local cell 120 and UE 130 is illustrated as interface 127 in FIG. 1. The radio interfaces 117 and 127 need not share a radio frequency or radio technology. For example, it's possible that cellular cell 110 conforms to wideband code division multiple access, WCDMA, or long term evolution, LTE, standards while the local cell 120 conforms to WLAN or LAE standards. The cellular cell 110 may operate on a licensed frequency band while local cell 120 may operate on an unlicenced frequency band. In order to communicate with cellular cell 110, UE 130 need not have active communications with local cell 120. UE 130 may be configured to scan for a beacon from BS 125 from radio interface 127. In some embodiments, UE 130 may need to discontinue active transmissions with BS 115 in order to scan for beacons from BS 125.

In UE 130, scanning for local cells such as cell 120 may involve an outlay of battery and/or time resources. For example, assuming that LAE cells use a frequency allocation of 1 GHz and a 5 MHz separation for individual bands, an UE 130 would need to scan altogether 200 frequency locations to cover the entire frequency allocation. If UE 130 spends, for example, 100 ms in each location, it would need a receiver on-time of 20 seconds to cover the 1 GHz allocation. If repeated every five minutes, for example, the scanning would correspond to a significant fraction of battery power usage in UE 130. If UE 130 has pre-knowledge of local cell beacon locations or densities in frequency bands, the scanning may be optimized to conserve battery and/or time resources. In WLAN, a beacon interval may be 100 ms or 500 ms, for example.

In some embodiments of the invention, UE 130 is configured to receive from BS 115 information that is usable for assisting and/or optimizing scanning for the beacon from BS 125. This may be known as local network connectivity information. In detail, such information may relate to local connectivity such as connectivity to BS 125, and/or to information usable in scanning for a beacon from BS 125. The information may comprise indicators relating at least one of: an operating frequency band, a radio technology, a cell identity, a beacon interval, a power level, a geographical or relative location, authentication methods and/or credentials of BS 125. A relative location may comprise, for example, a distance from BS 115 expressed in terms of delay, to define an annular region surrounding BS 115. If UE 130 determines it is in the annular region, it may scan for BS 125 and refrain from scanning otherwise.

Local network connectivity information received by UE 130 may comprise a scanning strategy designed to facilitate finding local cells such as cell 120, for example. Such a scanning strategy may comprise instructions to scan more frequently in geographical areas and frequency bands with a higher density of local cells and less frequently in geographical areas and frequency bands with a lower density of local cells. A scanning strategy may also or alternatively comprise information relating to how long UE 130 should listen to beacons per channel scanned. A geographical area may be defined in terms of cellular cells, for example BS 115 may provide UE 130 with information relevant to cell 110. As a specific example, a cellular cell may advise an attached UE to refrain from scanning entirely if there are no local cells within the coverage area of the cellular cell. By density it may be meant that a sub-band of a local cell frequency allocation has a certain number of local cell beacons. For example, if within a 1 GHz allocation there are 23 local cell beacons within an offset of 200 Mhz . . . 400 MHz and only 7 local cell beacons in offsets 0 MHz . . . 200 MHz and 400 MHz . . . 1000 MHz taken together, the sub-band 200 MHz . . . 400 MHz has a higher density than the rest of the allocation. Alternatively or in addition, density can refer to a situation where a geographical area has a certain density of local cells per unit of area on a given frequency band, such as number of local cell beacons per square kilometer on a given frequency band. Beacon information may also be provided on the level of buildings or even floors within buildings. A UE 130 that has access to accurate location information may be configured to utilize such information when scanning for beacons. As another example, a cellular cell may advise that within a routing area comprising among others the cellular cell in question, an UE should scan frequently on a certain sub-range of local-cell frequencies and less frequently outside the sub-range. In general, the information provided to an UE may comprise at least one frequency sub-band and information how often to scan on the sub-band. The information may comprise more than one sub-band and associated scanning frequency.

The cellular network may determine the scanning strategy based on reports it receives from the local cells. The local cells may be comprised in the same overall communication system as the cellular cells, whereby information needed to determine a scanning strategy may be available from network planning. Alternatively the local cells, or some of the local cells, may be independent of the cellular cells but furnished with connectivity to at least one node comprised in the cellular system. The independent local cells may inform the cellular system of their beacon parameters using this connectivity. The scanning strategy may be optimized for the UE 130 in terms of subscriber profile stored in the cellular network, whereby a cellular base station 115 may refrain from sending information to a UE 130 that would cause the UE 130 to scan for a local cell it cannot access due to restrictions in the subscriber profile. Likewise if the cellular network knows that UE 130 is not capable of communicating using a radio technology disposed in a local cell, it may refrain from advising the US 130 to scan for the local cell. The price of accessing a local cell may be taken into account. The price may depend on subscription information of UE 130 or its user. The cellular network may be provisioned with the subscriber information or the cellular network may have access to the subscriber information. In detail, lower-cost local cells may be indicated with higher weight relative to higher-cost local cells.

Alternatively to a scanning strategy, the local network connectivity information received by UE 130 may comprise information allowing the UE 130 to derive or modify a scanning strategy. Such information may comprise, for example, beacon density information per areas and frequency bands, beacon interval information of at least one local cell, frequency band information of at least one local cell, a power level used by at least one local cell and/or a beacon timing offset of at least one local cell. Frequency band information may comprise an operating frequency of at least one local cell. A beacon timing offset may inform UE 130 of a time when a local cell will transmit a beacon relative to a beacon of a cellular cell such as cell 110. Since a UE 130 attached to a cellular cell knows the beacon transmission times of the cellular cell, by additionally knowing the timing offset the UE 130 will know a precise time when a local cell will transmit a beacon and thus can perform a scan at that time to capture the beacon. Beacon density information may be categorized, for example bands may be classified in, for example, three or four density classes such as "low density", "medium density", "high density" and "no beacons".

The local network connectivity information received by UE 130 may also comprise information of geographical locations of local cells, which may comprise coordinates such as GPS coordinates, street addresses, identities of cellular cells wherein local cells are comprised, triangulated locations derived relative to cellular cells, or similar location indicators. The local network connectivity information may comprise technologies local cells use for communication, for example WLAN or LAE. The local network connectivity information may comprise information on services accessible via the respective local cells and/or authentication methods they accept, as well as credentials needed to access the local cells. Providing credentials may be advantageous when the local and cellular cells are comprised in the same overall communication system, since then the authentication infrastructure of the cellular system can be re-used by supplying credentials in local network connectivity information. The local network connectivity information received by UE 130 may also comprise a list of local cells and their associated frequencies, technologies, beacon intervals and power levels.

The local network connectivity information transmitted to UE 130 may be modified according to load statuses of access points. For example, access points may report high load status to the cellular network, whereby the cellular network may modify the local network connectivity information to exclude or weight down information relating to highly loaded access points. For example, a frequency band with many access points may not be indicated in local network connectivity information if the access points therein are heavily loaded and thus would not be capable of offering substantive service to UE 130. As another example, geographic locations of highly loaded access points may be omitted from local network connectivity information.

Whether UE 130 received a scanning strategy or other local network connectivity information, UE 130 may subsequent to receiving the local network connectivity information determine a scanning strategy to be used. If a scanning strategy was received in the local network connectivity information, the determining may comprise taking the received strategy into use. If the local network connectivity information didn't comprise a scanning strategy, the determining may comprise deriving a suitable strategy based on the received information.

Having performed at least one scan, UE 130 may be configured to report to BS 115 information on the results of the scan or scans, for example the identities and operating parameters of any discovered local cells. The cellular network may use such reports from UEs to compile updated local network connectivity information. The cellular network will receive more reports from user equipments located in areas with dense user equipment concentrations, which means that scanning strategies or other local network connectivity information derived at least in part from such reports is on average valid for user equipments in the area.

The UE 130 may receive the local network connectivity information responsive to a request it sends to BS 115, or UE 130 may receive the local network connectivity information unsolicited, meaning that the local network connectivity information is received without a prior request. Unsolicited information may be considered to be pushed to the UE 130. Local network connectivity information may be sent by BS 115 to UEs that attach to cell 110, or to UEs that experience some condition, such as high datarate or low mobility, for example. BS 115 may decide to transmit local network connectivity information to a UE that it determines to be immobile in a location where it can reach BS 125. If UE 130 requests local network connectivity information, it may in the request specify at least one area concerning which information is requested, and the corresponding information type. The area specification may comprise requesting information on individual local cells in the area of, for example, Helsinki, and density information for the rest of Finland. The information on local cells may be requested as location, frequency band and local cell identity information, for example.

Although it is illustrated in FIG. 1 that interface 117 is wireless, the invention is not limited thereto. In some embodiments UE 130 may receive the local network connectivity information via a wired interface such as, for example, a serial cable or universal serial bus, USB, interface. Although it is described above that UE 130 receives local network connectivity information from a cellular network, the invention is not restricted thereto. UE 130 may alternatively receive local network connectivity information, for example, from an independent web service that is available via an internet connection. In this case, UEs may register to the service, provide scanning reports, and receive assistance for network detection, for instance, through a WLAN AP or an internet service provider, ISP. In some embodiments, the independent web service may be accessible to UE 130 via a cellular network.

Figure 2:
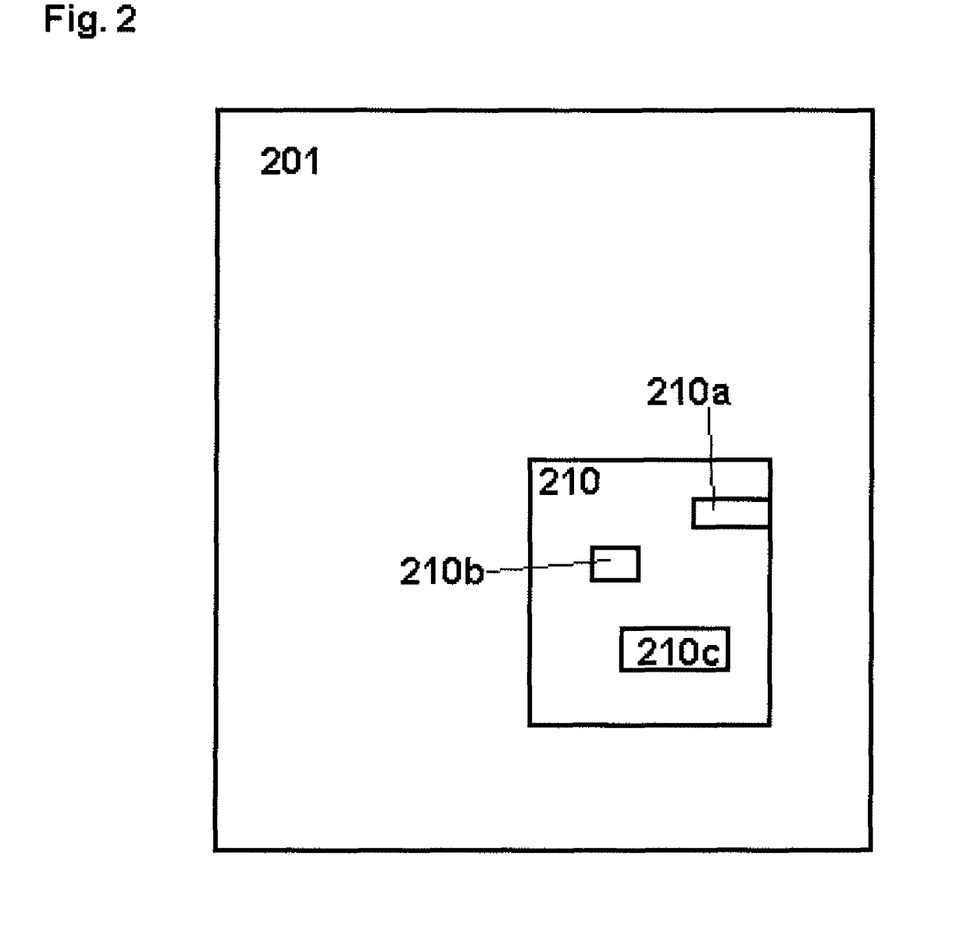
FIG. 2 illustrates an example apparatus 201 capable of supporting embodiments of the present invention.

FIG. 2 illustrates an example apparatus 201 capable of supporting embodiments of the present invention. The apparatus may correspond to UE 130 of FIG. 1, for example. The apparatus is a physically tangible object, for example a mobile telephone, personal digital assistant, data dongle or a similar device. The apparatus may comprise a control apparatus 210, for example a digital signal processor (DSP), processor, field-programmable gate array (FPGA), application-specific integrated circuit (ASIC), chipset or controller. The apparatus may further comprise transceiver circuitry 210*a* configured to enable the apparatus 201 to connect to a network. The apparatus may comprise memory 210*b* configured to store information, for example information relating to local network connectivity and/or a scanning strategy. The memory may be solid-state memory, dynamic random access memory (DRAM), magnetic, holographic or other kind of memory. The apparatus may comprise logic circuitry 210*c* configured to access the memory 210*b* and control the transceiver circuitry 210*a*. The logic circuitry 210*c* may be implemented as software, hardware or a combination of software and hardware. The logic circuitry 210*c* may execute program code stored in memory 210*b* to control the functioning of the apparatus 201 and cause it to perform functions related to embodiments of the invention. The logic circuitry 210*c* may be configured to initiate functions in the apparatus 201, for example the sending of data units via the transceiver circuitry 210*a*. The logic circuitry 210*c* may be control circuitry. The transceiver circuitry 210*a*, memory 210*b* and/or logic circuitry 210*c* may comprise hardware and/or software elements comprised in the control apparatus 210. Memory 210*b* may be comprised in the control apparatus 210, be external to it or be both external and internal to the control apparatus 210 such that the memory is split to an external part and an internal part. If the apparatus 201 does not comprise a control apparatus 210 the transceiver circuitry 210*a*, memory 210*b* and logic circuitry 210*c* may be comprised in the apparatus as hardware elements such as integrated circuits or other electronic components. The same applies if the apparatus 201 does comprise a control apparatus 210 but some, or all, of the transceiver circuitry 210a, memory 210b and logic circuitry 210c are not comprised in the control apparatus 210.

Figure 3:
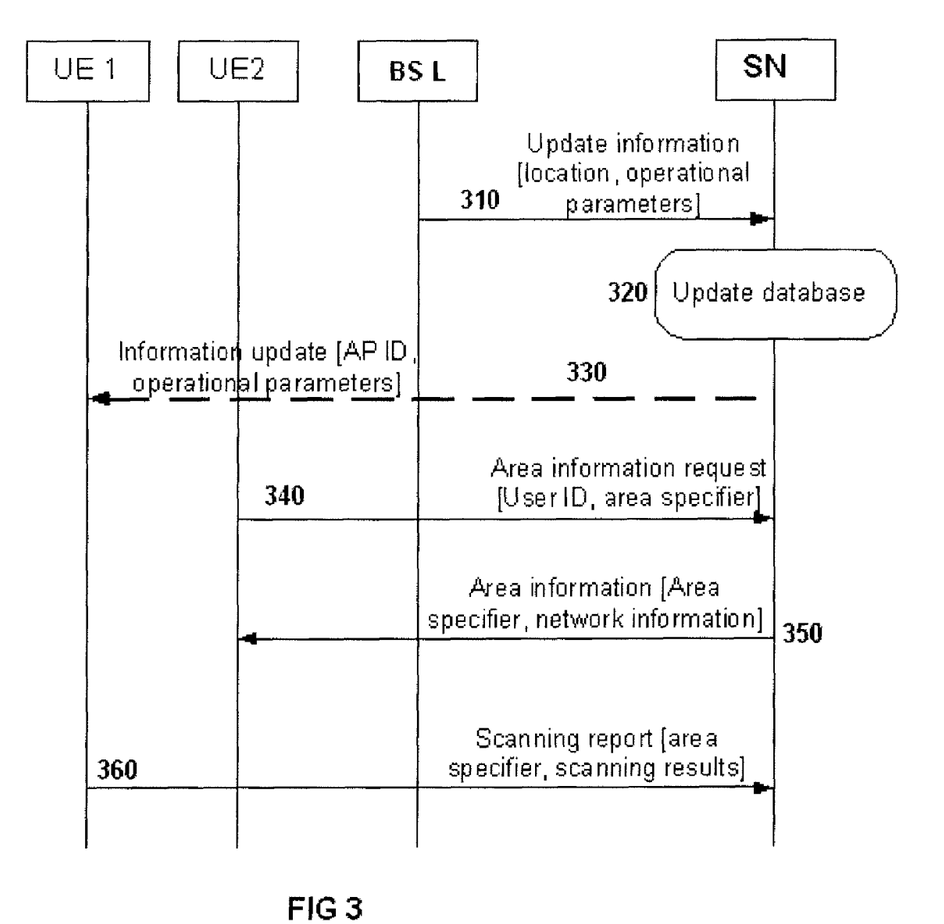
FIG. 3 illustrates signaling relating to some embodiments of the invention.

FIG. 3 illustrates signaling relating to some embodiments of the invention. Illustrated are two user equipments UE 1 and UE2, as well as local base station BS L and support node SN. The support node SN may be comprised in a base station such as a cellular base station, or it may be comprised in a data network accessible to user equipments. In the example illustrated, in phase 310 BS L informs a cellular network of its operational parameters. The parameters communicated may be usable in facilitating scanning for a beacon from BS L. The parameters may comprise parameters and information essentially as discussed above in connection with local cell specific information.

In phase 320 the cellular network may update its local network connectivity information. If the cellular network had information concerning the local cell of BS L prior to phase 310, older information may be overwritten with information received in the message of phase 310.

In phase 330, the cellular network transmits local network connectivity information to UE 1. The local network connectivity information may comprise at least one scanning strategy or other kind of local network connectivity information as discussed above. Phase 330 may occur responsive to a request from UE 1, not illustrated, or phase 330 may be unsolicited.

In phase 340 UE 2 transmits a request for local network connectivity information to support node SN. The request may comprise information specifying the kind of local network connectivity information UE 2 wants to receive responsive to the request. For example, the request may specify that UE 2 wants to receive density information of beacons in a certain geographic area, for example the frequency band with the highest beacon density in the given area or density information for all sub-bands of an overall frequency allocation.

In phase 350, support node SN responds to the request of UE 2 sent in phase 340 by transmitting the requested local network connectivity information. The transmitted information may conform partly or completely to what UE 2 requested in phase 340. If, for example, the cellular network doesn't have information on individual local cells that UE 2 requested in phase 340, it may still transmit density information.

In phase 360, UE 1 transmits a scanning report to support node SN, which support node SN may use to update the database the cellular network maintains of local network connectivity information. This updating may be similar to the updating which occurs in phase 320. The report may comprise information relating to local cell beacons detected by UE 1, or information that no local cell beacons were detected on a certain frequency during a scan. Support node SN may derive updated scanning strategies using the received reports. Such updated scanning strategies may be transmitted toward UEs as local network connectivity information.

Figure 4:
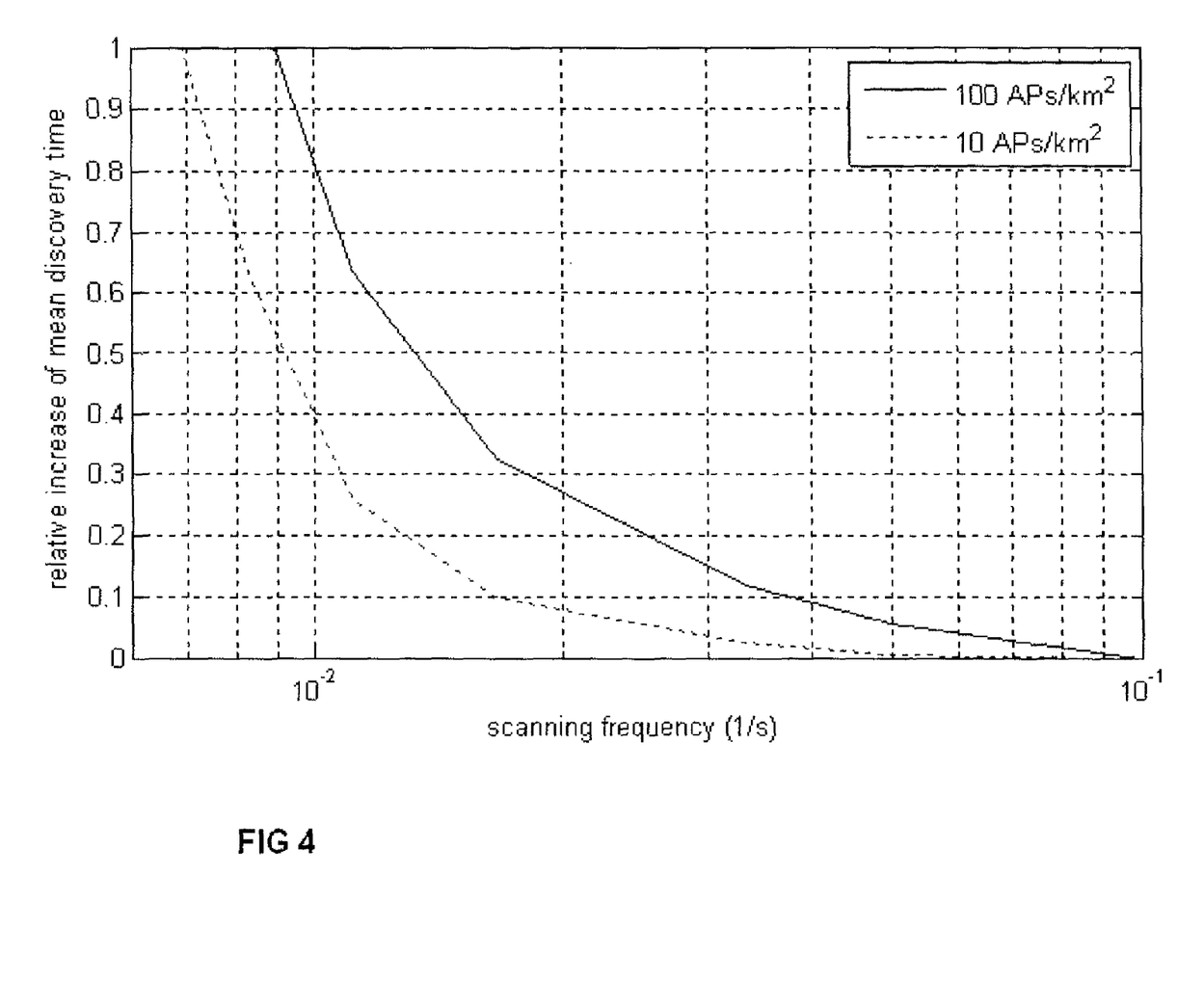
FIG. 4 illustrates a relative change in beacon discovery time as a function of scanning frequency in some embodiments of the invention.

FIG. 4 illustrates a relative change in beacon discovery time as a function of scanning frequency (inverse scanning interval). The figure is a result of a simulation where an UE is moving randomly at the speed of 1 m/s through an area where local cell BS with cell radii of 50 m are placed randomly, and the mean beacon discovery times were recorded for different scanning intervals. On the vertical axis is a relative change of a mean discovery (t–t_min)/t_min, where t_min is the discovery time with a theoretical infinite scanning frequency, and on the horizontal axis is the scanning frequency. Geographical densities of 10 local cell $BS/km^2$ and 100 local cell $BS/km^2$, illustrated as $APs/km^2$, were considered. As can be seen from the figure, knowledge of the geographical density can be used to select an optimal scanning frequency since the same relative increase in discovery time, 30%, can be obtained with approximately a scanning frequency of 0.01 for the lower density and a scanning frequency of approximately 0.02 for the higher density.

Figure 5:
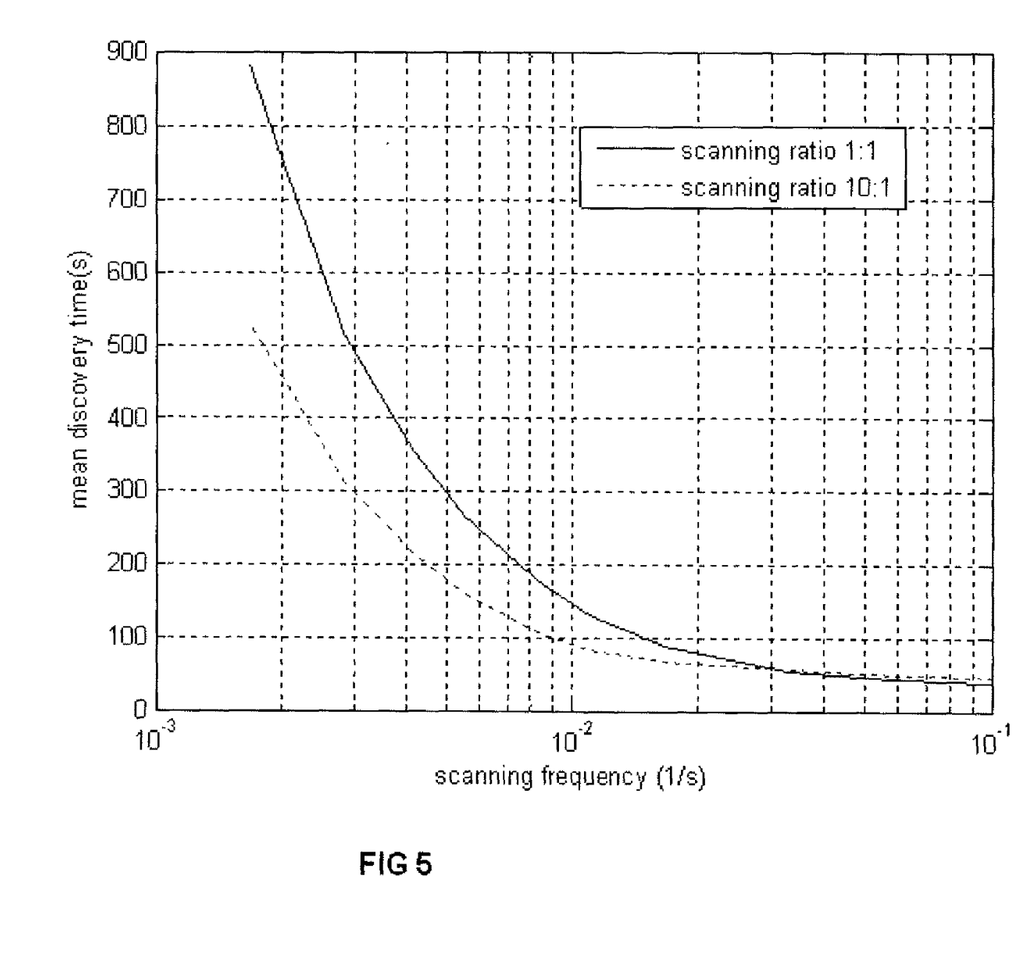
FIG. 5 illustrates mean network discovery time as a function of inverse scanning interval in some embodiments of the invention.

FIG. 5 illustrates mean network discovery time as a function of scanning frequency in some embodiments of the invention. FIG. 5 is based on a similar simulation as FIG. 4. In this figure, the vertical axis captures the mean beacon discovery time and the horizontal axis has the inverse scanning interval in Hertz. The figure illustrates scanning in two frequency bands, where the first has a local cell density of 10 local $cells/km^2$ and the second has a density of 100 local $cells/km^2$. The solid line corresponds to scanning both bands equally and the dashed line corresponds to making only every $11^{th}$ scan in the band whose network density is lower. When aiming to a 200-second discovery time, a saving of about 40% can be obtained by scanning the band with a lower density of local BS less frequently.

Without in any way limiting the scope, interpretation, or application of the claims appearing below, a technical effect of one or more of the example embodiments disclosed herein is that scanning for local cell beacons can be performed in an optimized fashion, conserving battery and time resources. Another technical effect of one or more of the example embodiments disclosed herein is that information on local cells maintained in cellular networks may be kept up to date.

Embodiments of the present invention may be implemented in software, hardware, application logic or a combination of software, hardware and application logic. The software, application logic and/or hardware may reside on memory 210b. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    transceiver circuitry configured to receive local network connectivity information from a first interface;
    logic circuitry configured to determine a scanning strategy based at least in part on the received information;
    memory configured to store the received information and parameters relating to the determined scanning strategy; and
    the logic circuitry further configured to cause the discovering of a local network cell over a wireless second interface using at least in part the determined scanning strategy,
    wherein the local network connectivity information comprises at least one of: a density of local networks per frequency band and a density of local networks per frequency band and area.

2. An apparatus according to claim 1, wherein the local network connectivity information is unsolicited.

3. An apparatus according to claim 1, wherein the local network connectivity information defines the scanning strategy.

4. An apparatus according to claim 3, wherein the scanning strategy comprises indications defining at least a first frequency band and a second frequency band and instructions to scan more frequently on the first frequency band than on the second frequency band.

5. An apparatus according to claim 1, wherein the first interface is a cellular wireless interface.

6. An apparatus according to claim 1, wherein the local network connectivity information is received responsive to a request transmitted from the apparatus.

7. An apparatus according to claim 6, wherein the request comprises at least one indication of a geographical area concerning which the local network connectivity information is requested.

8. An apparatus according to claim 6, wherein the request comprises an indication relating to a kind of local network connectivity information that is requested, the kind comprising at least one of: density information and information relating to individual local cells.

9. An apparatus according to claim 1, wherein the wireless second interface comprises an interface to a local cell.

10. An apparatus according to claim 1, wherein the logic circuitry is further configured to cause the transceiver circuitry to cause the apparatus to transmit a report over the first interface, the report comprising information obtained from performing the discovering.

11. An apparatus according to claim 1, wherein the scanning strategy comprises information defining one or more of how often the frequency band is to be scanned and a duration of time for listening to beacons per channel scanned.

12. A method, comprising:
    receiving in a user equipment local network connectivity information over a first interface;
    determining a scanning strategy based at least in part on the received information; and
    discovering a local network over a wireless second interface using at least in part the determined scanning strategy,
    wherein the local network connectivity information comprises at least one of: a density of local networks per frequency band and a density of local networks per frequency band and area.

13. A method according to claim 12, wherein the local network connectivity information is unsolicited.

14. A method according to claim 12, wherein the local network connectivity information defines the scanning strategy.

15. A method according to claim 14, wherein the scanning strategy comprises indications defining at least a first frequency band and a second frequency band and instructions to scan more frequently on the first frequency band than on the second frequency band.

16. A method according to claim 12, wherein the first interface is a cellular wireless interface.

17. A method according to claim 12, wherein the local network connectivity information is received responsive to a request transmitted from the user equipment.

18. A method according to claim 17, wherein the request comprises at least one indication of a geographical area concerning which the local network connectivity information is requested.

19. A method according to claim 17, wherein the request comprises an indication relating to a kind of local network connectivity information that is requested, the kind comprising at least one of: density information and information relating to individual local cells.

20. A method according to claim 12, wherein the wireless second interface comprises an interface to a local cell.

21. A method according to claim 12, further comprising causing transmission of a report over the first interface, the report comprising information obtained from performing the discovering.

22. An apparatus, comprising:
    at least one processor; and
    at least one memory including computer program code
    the at least one memory and the computer program code configured to, with the at least one processor, cause the apparatus to perform at least the following:
    receive local network connectivity information over a first interface;
    determine a scanning strategy based at least in part on the received information; and
    discover a local network over a wireless second interface using at least in part the determined scanning strategy,
    wherein the local network connectivity information comprises at least one of: a density of local networks per frequency band and a density of local networks per frequency band and area.

23. A computer program product comprising a non-transitory computer-readable storage medium encoded with instructions that, when executed by at least one processor, perform at least the following:
    receiving local network connectivity information over a first interface;
    determining a scanning strategy based at least in part on the received information; and
    discovering a local network over a wireless second interface using at least in part the determined scanning strategy,
    wherein the local network connectivity information comprises at least one of: a density of local networks per frequency band and a density of local networks per frequency band and area.

24. An apparatus, comprising:
    at least one processor; and
    at least one memory including computer program code the at least one memory and the computer program code configured to, with the at least one processor, cause the apparatus to perform at least the following:

receive a plurality of reports from user equipments, the reports comprising information relating to scanning results;
update a database of local cells based on the reports; and
transmit local network connectivity information to a user equipment, the local network connectivity information comprising at least one of: a density of local networks per frequency band and a density of local networks per frequency band and area.

* * * * *